(12) United States Patent
Sambhav et al.

(10) Patent No.: US 11,828,222 B2
(45) Date of Patent: Nov. 28, 2023

(54) SEALING STRUCTURE OF TURBOCHARGER AND TURBOCHARGER

(71) Applicant: MITSUBISHI HEAVY INDUSTRIES ENGINE & TURBOCHARGER, LTD., Sagamihara (JP)

(72) Inventors: Jain Sambhav, Sagamihara (JP); Yosuke Danmoto, Sagamihara (JP); Youji Akiyama, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 23 days.

(21) Appl. No.: 17/606,563

(22) PCT Filed: May 31, 2019

(86) PCT No.: PCT/JP2019/021668
§ 371 (c)(1),
(2) Date: Oct. 26, 2021

(87) PCT Pub. No.: WO2020/240805
PCT Pub. Date: Dec. 3, 2020

(65) Prior Publication Data
US 2022/0205382 A1    Jun. 30, 2022

(51) Int. Cl.
*F02B 37/24*    (2006.01)
*F01D 17/16*    (2006.01)

(52) U.S. Cl.
CPC ............ *F02B 37/24* (2013.01); *F01D 17/165* (2013.01); *F05D 2220/40* (2013.01); *F05D 2240/128* (2013.01); *F05D 2240/58* (2013.01)

(58) Field of Classification Search
CPC ........ F02B 37/22; F02B 37/225; F02B 37/24; F02B 39/00; F01D 17/14; F01D 17/16;
(Continued)

(56) References Cited

U.S. PATENT DOCUMENTS 8,763,393 B2    7/2014    Severin et al.
2010/0301567 A1    12/2010    Schmitt
(Continued)

FOREIGN PATENT DOCUMENTS

DE    10 2007 049 925 A1    4/2009
DE    10 2012 006 711 A1    7/2013
(Continued)

OTHER PUBLICATIONS

Office Action dated Aug. 9, 2022 issued in counterpart Japanese Application No. 2021-521717 with an English Translation.
(Continued)

*Primary Examiner* — Loren C Edwards
(74) *Attorney, Agent, or Firm* — Birch, Stewart, Kolasch & Birch, LLP

(57) ABSTRACT

A sealing structure of a turbocharger includes a turbine housing including a scroll channel, a nozzle mount, a nozzle plate defining, with the nozzle mount, an exhaust gas channel for introducing an exhaust gas from the scroll channel to a turbine wheel, the nozzle plate including an annular plate portion that has a channel wall surface defining the exhaust gas channel and a tubular portion that extends from an inner peripheral end portion on a back surface of the annular plate portion toward a first inner wall surface of the turbine housing, and a sealing device for sealing a section between the first inner wall surface and an end surface of the tubular portion. The sealing device includes a first plate member that has one surface contacting the end surface of the tubular portion, and a sealing member for sealing a section between the first inner wall surface and another surface of the first plate member, the sealing member being configured to bias the first plate member toward the end surface of the tubular portion.

5 Claims, 13 Drawing Sheets

(58) Field of Classification Search
CPC ...... F01D 17/165; F01D 11/003; F01D 25/24; F05D 2220/40; F05D 2240/128; F05D 2240/55; F05D 2240/58
See application file for complete search history.

(56) References Cited

U.S. PATENT DOCUMENTS

| | | | |
|---|---|---|---|
| 2012/0263585 A1 | 10/2012 | Matsuyama | |
| 2013/0036733 A1* | 2/2013 | Severin | F02C 6/12 |
| | | | 29/888.024 |
| 2013/0170975 A1 | 7/2013 | Ishii | |
| 2014/0241858 A1 | 8/2014 | Tashiro et al. | |
| 2014/0322005 A1 | 10/2014 | Ihli et al. | |
| 2015/0003957 A1* | 1/2015 | Gerard | F01D 17/165 |
| | | | 415/170.1 |
| 2015/0056067 A1 | 2/2015 | Segawa | |

FOREIGN PATENT DOCUMENTS

| | | | | |
|---|---|---|---|---|
| EP | 2 685 054 B1 | 11/2020 | | |
| JP | 62-108501 | * 7/1987 | ............. | F01D 11/00 |
| JP | 62-108501 U | 7/1987 | | |
| JP | 2006-125588 A | 5/2006 | | |
| JP | 2006125588 A | * 5/2006 | ............. | Y02T 10/12 |
| JP | 2010-190092 A | 9/2010 | | |
| JP | 4729901 B2 | 7/2011 | | |
| JP | 5118767 B1 | 1/2013 | | |
| JP | 2013-68153 A | 4/2013 | | |
| JP | 5949164 B2 | 7/2016 | | |

OTHER PUBLICATIONS

International Preliminary Report on Patentability and English translation of the Written Opinion of the International Searching Authority for International Application No. PCT/JP2019/021668, dated Dec. 9, 2021.
International Search Report for International Application No. PCT/JP2019/021668, dated Jul. 2, 2019.
Chinese Office Action and Search Report for Chinese Application No. 201980095923.0, dated Apr. 12, 2023.

* cited by examiner

SEALING STRUCTURE OF TURBOCHARGER AND TURBOCHARGER

TECHNICAL FIELD

The present disclosure relates to a sealing structure for sealing a clearance formed inside a turbine housing in a turbocharger, and a turbocharger having the above-described sealing structure.

BACKGROUND

Conventionally, a variable geometry turbocharger is known as a turbocharger for supercharging intake air by using exhaust energy of an engine (see Patent Document 1, for example). The variable geometry turbocharger adjusts the flow of an exhaust gas from a scroll channel of a turbine housing to a turbine wheel, thereby changing the flow velocity and the pressure of the exhaust gas sent to the turbine wheel to enhance a supercharging effect.

The above-described variable nozzle mechanism generally includes a nozzle vane (variable nozzle) disposed on an exhaust gas channel for introducing the exhaust gas from the scroll channel to the turbine wheel, an annular nozzle mount housed in the turbine housing, for rotatably supporting the nozzle vane, and an annular nozzle plate defining the exhaust gas channel with the nozzle mount.

Patent Document 1 discloses a sealing structure that includes the nozzle plate which includes a tubular portion housed in the turbine housing and a nozzle portion extending radially outward from one end of the tubular portion, and a seal ring for sealing a section between an another end surface of the tubular portion and an inner wall surface (stepped surface) of the turbine housing.

The seal ring described in Patent Document 1 is constituted by an annular body having a U-shaped or V-shaped cross-section, and is configured such that an opening side of the above-described cross-section is directed in the radial direction. The above-described seal ring seals a section between the another end surface of the tubular portion and the inner wall surface (stepped surface) of the turbine housing by bringing, of two leg portions defined by the U-shaped or V-shaped cross-section, one leg portion into contact with the another end surface of the tubular portion and the other leg portion into contact with the inner wall surface (stepped surface) of the turbine housing.

CITATION LIST

Patent Literature

Patent Document 1: U.S. Pat. No. 8,763,393B

SUMMARY

Technical Problem

The turbine housing and the nozzle plate in the sealing structure described in Patent Document 1 are deformed by receiving heat of the exhaust gas during operation of the turbocharger. Differences in thermal expansion coefficient and thermal energy received by the turbine housing and the nozzle plate from the exhaust gas cause a difference in thermal deformation amount, and the above-described difference changes a relative positional relationship between the turbine housing and the nozzle plate.

The seal ring whose leg portions are in contact with the turbine housing and the nozzle plate, respectively, is deformed or the leg portions slide with respect to the turbine housing or the nozzle plate, every time the above-described relative positional relationship is changed. The seal ring may be deteriorated and decreased in elastic force by repeating the above-described deformation, and the leg portions may wear by repeating sliding of the leg portions. Further, the seal ring may be deteriorated and decreased in elastic force by repeating thermal expansion and thermal contraction upon reception of heat from the exhaust gas during the operation of the turbocharger. Thus, the seal ring in the above-described sealing structure may not be able to exert stable sealing performance over a long period of time.

In view of the above, an object of at least one embodiment of the present invention is to provide the sealing structure of the turbocharger capable of exerting stable sealing performance over a long period of time.

Solution to Problem (1) A sealing structure of a turbocharger according to at least one embodiment of the present invention includes a turbine housing including a scroll channel, a nozzle mount supported in the above-described turbine housing, a nozzle plate defining, with the above-described nozzle mount, an exhaust gas channel for introducing an exhaust gas from the above-described scroll channel to a turbine wheel, the nozzle plate including an annular plate portion that has a channel wall surface defining the above-described exhaust gas channel on one side in a thickness direction and a tubular portion that extends from an inner peripheral end portion on a back surface of the above-described annular plate portion located on another side in the above-described thickness direction toward a first inner wall surface of the above-described turbine housing, and a sealing device for sealing a section between the above-described first inner wall surface and an end surface of the above-described tubular portion. The above-described sealing device includes a first plate member that has one surface contacting the above-described end surface of the above-described tubular portion, and a sealing member for sealing a section between the above-described first inner wall surface and another surface of the above-described first plate member, the sealing member being configured to bias the above-described first plate member toward the above-described end surface of the above-described tubular portion.

With the above configuration (1), since the first plate member is supported between the sealing member and the nozzle plate by being biased toward the end surface of the tubular portion of the nozzle plate with the sealing member, the one surface of the first plate member is swingable with respect to the end surface of the tubular portion. The above-described sealing structure can suppress a change in relative positional relationship between the first inner wall surface of the turbine housing and the another surface of the first plate member by sliding the nozzle plate with respect to the first plate member upon reception of heat from the exhaust gas. By suppressing the change in relative positional relationship between the first inner wall surface of the turbine housing and the another surface of the first plate member, it is possible to suppress deformation and wear of the sealing member for sealing the section between the first inner wall surface of the turbine housing and the another surface of the first plate member.

Further, the first plate member blocks heat (shields heat) from the nozzle plate and the exhaust gas flowing from the scroll channel to prevent the heat from being transmitted to the sealing member, making it possible to suppress thermal expansion and thermal contraction of the sealing member, and thus to suppress a decrease in sealing performance due to fatigue of the sealing member. Thus, with the sealing structure of the turbocharger described above, it is possible to exert stable sealing performance over a long period of time.

(2) In some embodiments, in the sealing structure of the turbocharger according to the above configuration (1), the above-described first plate member includes a radial plate portion that extends toward a second inner wall surface of the above-described turbine housing extending in a direction intersecting with the above-described first inner wall surface, and the above-described radial plate portion has an outer end surface configured to contact the above-described second inner wall surface.

With the above configuration (2), since the outer end surface of the radial plate portion is in contact with the second inner wall surface of the turbine housing, extension of the first plate member to the radially outer side upon reception of heat from the exhaust gas is restricted. As a result, it is possible to make the turbine housing and the first plate member a uniform thermal deformation amount in the radial direction, upon reception of heat from the exhaust gas. Making the turbine housing and the first plate member the uniform thermal deformation amount in the radial direction, the above-described sealing structure can more effectively suppress the change in relative positional relationship between the first inner wall surface of the turbine housing and the another surface of the first plate member upon reception of heat from the exhaust gas, and thus to suppress deformation and wear of the sealing member more effectively.

Further, since the outer end surface of the radial plate portion is in contact with the second inner wall surface of the turbine housing, the first plate member can prevent the exhaust gas that does not pass through the turbine wheel from contacting the sealing member, making it possible to suppress thermal expansion and thermal contraction of the sealing member more effectively.

(3) In some embodiments, in the sealing structure of the turbocharger according to the above configuration (1) or (2), the above-described sealing member is configured to contact the above-described first inner wall surface.

With the above configuration (3), configured to contact the first inner wall surface, the sealing member can seal the section between the first inner wall surface and the another surface of the first plate member.

(4) In some embodiments, in the sealing structure of the turbocharger according to the above configuration (1) or (2), the above-described sealing device further includes a second plate member that has one surface contacting the above-described first inner wall surface, and the above-described sealing member is configured to contact another surface of the above-described second plate member.

With the above configuration (4), configured to contact the another surface of the second plate member with the one surface contacting the first inner wall surface, the sealing member can block heat (shield heat) from the turbine housing by the second plate member. Blocking the heat from the turbine housing, it is possible to suppress thermal expansion and thermal contraction of the sealing member, and thus to suppress the decrease in sealing performance due to fatigue of the sealing member.

(5) In some embodiments, in the sealing structure of the turbocharger according to any one of the above configurations (1) to (4), the above-described first plate member includes a radial plate portion that extends toward a second inner wall surface of the above-described turbine housing extending in a direction intersecting with the above-described first inner wall surface, and an axial plate portion that extends from an inner end portion of the above-described radial plate portion toward the above-described first inner wall surface.

With the above configuration (5), since the first plate member includes the axial plate portion that extends from the inner end portion of the radial plate portion toward the first inner wall surface, by narrowing the clearance between the first plate member and the turbine housing with the axial plate portion, it is possible to suppress that the exhaust gas having passed through the turbine wheel flows toward the sealing member through the above-described clearance. By suppressing that the exhaust gas having passed through the turbine wheel contacts the sealing member, it is possible to suppress thermal expansion and thermal contraction of the sealing member more effectively.

(6) In some embodiments, in the sealing structure of the turbocharger according to any one of the above configurations (1) to (5), the above-described sealing device further includes a third plate member mounted to an outer peripheral surface of the above-described tubular portion, the third plate member extending toward a second inner wall surface of the above-described turbine housing extending in a direction intersecting with the above-described first inner wall surface.

With the above configuration (6), since the sealing device includes the third plate member extending toward the second inner wall surface of the turbine housing, by narrowing the clearance between the nozzle plate and the second inner wall of the turbine housing with the third plate member, it is possible to suppress the flow rate of the exhaust gas flowing toward the sealing member through the above-described clearance. Suppressing the flow rate of the exhaust gas flowing toward the sealing member, it is possible to reduce the amount of thermal energy applied from the exhaust gas to the sealing member, and to suppress thermal expansion and thermal contraction of the sealing member.

(7) In some embodiments, in the sealing structure of the turbocharger according to any one of the above configurations (1) to (6), the above-described sealing member has a cross-sectional shape which is formed into a U-shape, a V-shape, or a J-shape having an opening on a radially outer side.

With the above configuration (7), since the cross-sectional shape of the sealing member is formed into the U-shape, the V-shape, or the J-shape having the opening on the radially outer side, the opening of the sealing member is directed to the side of the scroll channel when the sealing member seals the section between the first inner wall surface and the another surface of the first plate member. Thus, the opening is expanded by a pressure of the exhaust gas in the scroll channel, the above-described sealing member can effectively seal the section between the above-described first inner wall surface and the end surface of the tubular portion.

(8) In some embodiments, in the sealing structure of the turbocharger according to any one of the above configurations (1) to (7), the above-described turbine housing includes a second inner wall surface configured to extend in a direction intersecting with the above-described first inner wall surface, and to have a clearance between the second inner wall surface and an outer peripheral surface of the above-described tubular portion of the above-described nozzle plate, and a third inner wall surface configured to extend in a direction intersecting with the above-described second inner wall surface, and to have a clearance between the third inner wall surface and the above-described back surface of the above-described annular plate portion of the above-described nozzle plate, and in at least one of the above-described second inner wall surface and the above-described third inner wall surface of the above-described turbine housing, as well as the above-described outer peripheral surface of the above-described tubular portion and the above-described back surface of the above-described annular plate portion of the above-described nozzle plate, at least one groove portion extending along a circumferential direction is formed.

With the above configuration (8), since in the least one of the second inner wall surface and the third inner wall surface of the turbine housing, as well as the outer peripheral surface of the tubular portion and the back surface of the annular plate portion of the nozzle plate, the at least one groove portion extending along the circumferential direction is formed, by expanding the exhaust gas flowing from the scroll channel toward the sealing member with the at least one groove portion (expansion chamber) to increase a pressure loss, it is possible to suppress the flow rate of the exhaust gas flowing toward the sealing member. Suppressing the flow rate of the exhaust gas flowing toward the sealing member, it is possible to reduce the amount of thermal energy applied from the exhaust gas to the sealing member, and to suppress thermal expansion and thermal contraction of the sealing member.

(9) In some embodiments, in the sealing structure of the turbocharger according to the above configuration (8), the above-described at least one groove portion includes a third inner wall surface-side groove portion formed in the above-described third inner wall surface, and the above-described nozzle plate further includes a nozzle plate-side protruding portion protruding into the above-described third inner wall surface-side groove portion from the above-described back surface.

With the above configuration (9), since the nozzle plate includes the nozzle plate-side protruding portion protruding into the third inner wall surface-side groove portion from the back surface, by increasing the entire length of the clearance between the turbine housing and the nozzle plate with the nozzle plate-side protruding portion protruding into the third inner wall surface-side groove portion, it is possible to suppress the flow rate of the exhaust gas flowing toward the sealing member. Suppressing the flow rate of the exhaust gas flowing toward the sealing member, it is possible to reduce the amount of thermal energy applied from the exhaust gas to the sealing member, and to suppress thermal expansion and thermal contraction of the sealing member.

(10) In some embodiments, in the sealing structure of the turbocharger according to the above configuration (8) or (9), the above-described at least one groove portion includes a back surface-side groove portion formed in the above-described back surface of the above-described annular plate portion, and the above-described turbine housing further includes a housing-side protruding portion protruding into the above-described back surface-side groove portion from the above-described third inner wall surface.

With the above configuration (10), since the turbine housing includes the housing-side protruding portion protruding into the back surface-side groove portion from the third inner wall surface, by increasing the entire length of the clearance between the turbine housing and the nozzle plate with the housing-side protruding portion protruding into the back surface-side groove portion, it is possible to suppress the flow rate of the exhaust gas flowing toward the sealing member. Suppressing the flow rate of the exhaust gas flowing toward the sealing member, it is possible to reduce the amount of thermal energy applied from the exhaust gas to the sealing member, and to suppress thermal expansion and thermal contraction of the sealing member.

(11) A turbocharger according to at least one embodiment of the present invention includes a turbine wheel, and the sealing structure of the turbocharger according to any one of the above configurations (1) to (10).

With the above configuration (11), the sealing structure of the turbocharger can exert stable sealing performance over a long period of time, making it possible to suppress a decrease in performance of the turbocharger over a long period of time.

Advantageous Effects

According to at least one embodiment of the present invention, provided is a sealing structure of a turbocharger capable of exerting stable sealing performance over a long period of time.

DETAILED DESCRIPTION

Figure 1:
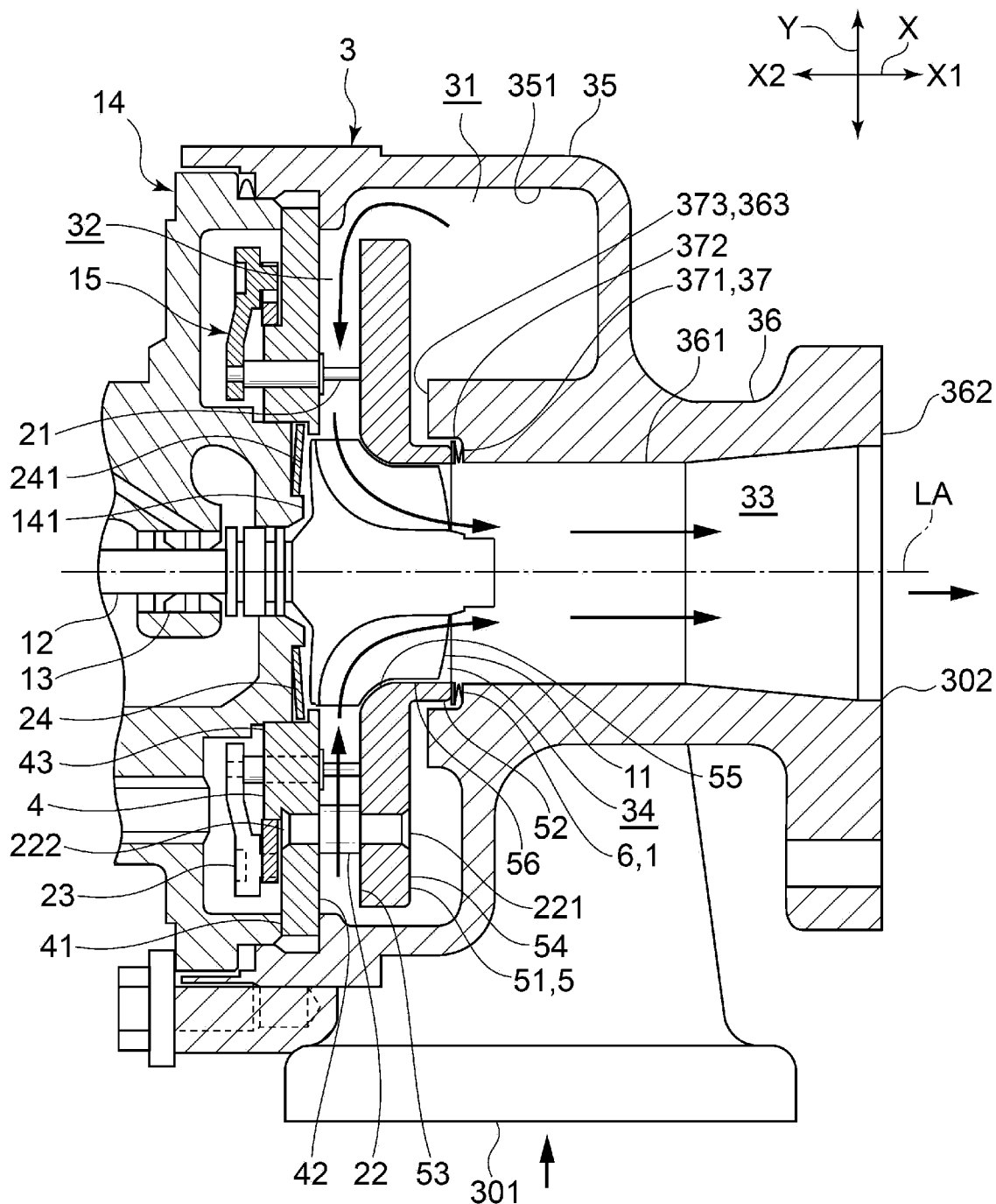
FIG. 1 is a schematic cross-sectional view with the axis of a turbocharger having a sealing structure according to an embodiment of the present invention.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including" or "having" one constitutional element is not an exclusive expression that excludes the presence of other constitutional elements.

The same configurations are indicated by the same reference characters and may not be described again in detail.

Figure 2:
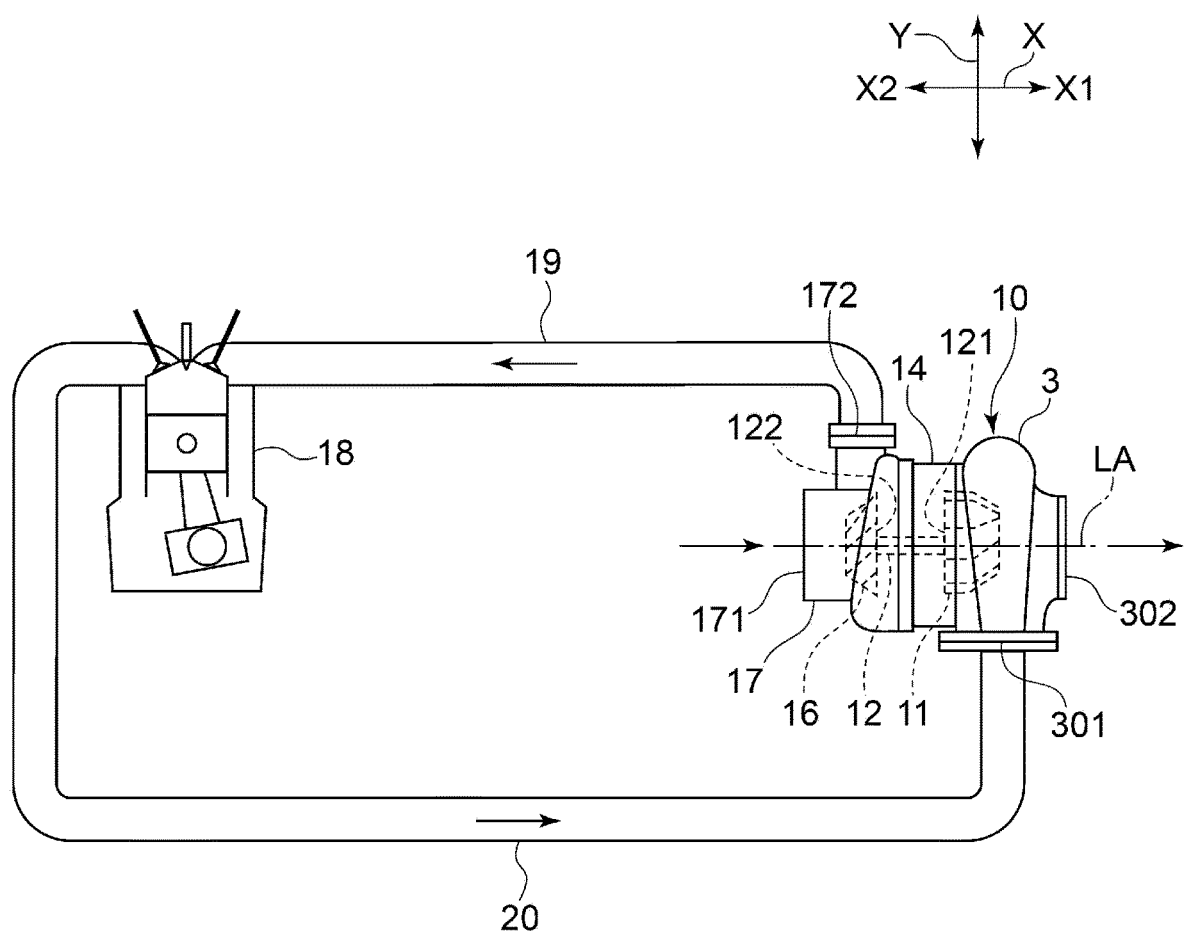
FIG. 2 is a schematic configuration view of an engine including the turbocharger according to an embodiment of the present invention.

FIG. 1 is a schematic cross-sectional view with the axis of a turbocharger having a sealing structure according to an embodiment of the present invention. FIG. 2 is a schematic configuration view of an engine including the turbocharger according to an embodiment of the present invention.

As shown in FIG. 1, a sealing structure 1 according to some embodiments is mounted on a turbocharger 10.

As shown in FIG. 1, the turbocharger 10 (variable geometry turbocharger) according to some embodiments includes a turbine wheel 11, a turbine housing 3 for internally housing the turbine wheel 11, a rotational shaft 12, a bearing 13 for rotatably supporting the rotational shaft 12, a bearing housing 14 for internally housing the bearing 13, and a variable nozzle device 15 installed in a combination of the turbine housing 3 and the bearing housing 14.

As shown in FIG. 2, the turbocharger 10 further includes a compressor wheel 16 and a compressor housing 17 for internally housing the compressor wheel 16.

Hereinafter, an extension direction of the axis LA of the turbine housing 3 will be referred to as an axial direction X, and a direction orthogonal to the axis LA will be referred to as a radial direction Y. Of the axial direction X, a side (a right side in the drawing) on which the turbine housing 3 is located with respect to the bearing housing 14 will be referred to as one side X1, and a side (a left side in the drawing) on which the compressor housing 17 is located with respect to the bearing housing 14 will be referred to as another side X2.

As shown in FIG. 2, the compressor housing 17 is disposed opposite to the turbine housing 3 across the bearing housing 14 in the axial direction X. Each of the turbine housing 3 and the compressor housing 17 is coupled and fixed to the bearing housing 14 by a fastening member such as a bolt or a V clamp.

As shown in FIG. 2, the rotational shaft 12 has a longitudinal direction along the axial direction X. The rotational shaft 12 is mechanically coupled to the turbine wheel 11 at an end portion 121 on the one side X1 in the above-described longitudinal direction, and is mechanically coupled to the compressor wheel 16 at an end portion 122 on the another side X2 in the above-described longitudinal direction. The turbine wheel 11 is disposed coaxially with the compressor wheel 16.

As shown in FIG. 2, the compressor wheel 16 is disposed on a supply line 19 for supplying air (combustion gas) to an engine 18 (combustion device). The turbine wheel 11 is disposed on a discharge line 20 for discharging an exhaust gas from the engine 18.

The turbocharger 10 rotates the turbine wheel 11 by the exhaust gas introduced from the engine 18 (combustion device) into the turbine housing 3 through the discharge line 20. Since the compressor wheel 16 is mechanically coupled to the turbine wheel 11 via the rotational shaft 12, the compressor wheel 16 rotates in conjunction with the rotation of the turbine wheel 11. Rotating the compressor wheel 16, the turbocharger 10 compresses the air (combustion gas) introduced into the compressor housing 17 through the supply line 19 and sends the compressed air to the above-described engine 18.

In the illustrated embodiment, as shown in FIG. 2, the turbine housing 3 includes an exhaust gas introduction port 301 for introducing the exhaust gas into the turbine housing 3 from the outer side in the radial direction Y, and an exhaust gas discharge port 302 for discharging the exhaust gas having rotated the turbine wheel 11 to the outside of the turbine housing 3 along the axial direction X.

In the illustrated embodiment, as shown in FIG. 2, the compressor housing 17 includes an air intake port 171 for introducing air from the outside of the compressor housing 17 along the axial direction X, and an air supply port 172 for discharging the air having passed through the compressor wheel 16 to the outside of the compressor housing 17 along the radial direction Y and sending the discharged air to the engine 18.

As shown in FIG. 1, the turbine housing 3 includes a wheel housing chamber 34 for housing the turbine wheel 11, a scroll channel 31 for sending the exhaust gas introduced from the exhaust gas introduction port 301 to the wheel housing chamber 34, and an exhaust gas discharge channel 33 for sending the exhaust gas from the wheel housing chamber 34 to the exhaust gas discharge port 302. The wheel housing chamber 34 houses the turbine wheel 11 in a rotatable state.

The scroll channel 31 has a scroll shape surrounding the periphery (the outer side in the radial direction Y) of the wheel housing chamber 34. The above-described scroll channel 31 is disposed upstream of the wheel housing chamber 34 in a flowing direction of the exhaust gas, and communicates with the exhaust gas introduction port 301 and the wheel housing chamber 34. The scroll channel 31 is defined by a scroll inner wall surface 351 of a scroll forming portion 35. In other words, the turbine housing 3 includes the scroll forming portion 35, and the above-described scroll forming portion 35 has the scroll inner wall surface 351 defining the scroll channel 31.

The exhaust gas discharge channel 33 is disposed between the wheel housing chamber 34 and the one side X1, and extends along the axial direction X. The above-described exhaust gas discharge channel 33 is disposed downstream of the wheel housing chamber 34 in the flowing direction of the exhaust gas, and communicates with the wheel housing chamber 34 and the exhaust gas discharge port 302. The exhaust gas discharge channel 33 is defined by a bore inner wall surface 361 (inner peripheral surface) of a tubular bore forming portion 36 extending along the axial direction X. In other words, the turbine housing 3 includes the bore forming portion 36, and the above-described bore forming portion 36 has the bore inner wall surface 361 defining the exhaust gas discharge channel 33. The above-described exhaust gas discharge port 302 opens to a downstream opening end portion 362 of the bore forming portion 36.

As shown in FIG. 1, the turbine housing 3 includes a first inner wall surface 371 extending along the direction intersecting with (orthogonal to) the axis LA, a second inner wall surface 372 extending along the axis LA, and a third inner wall surface 373 extending along the direction intersecting with (orthogonal to) the axis LA.

In the illustrated embodiment, each of the first inner wall surface 371, the second inner wall surface 372, and the third inner wall surface 373 is formed in an upstream opening end portion 363 of the bore forming portion 36. In some other embodiments, each of the first inner wall surface 371, the second inner wall surface 372, and the third inner wall surface 373 may be formed in a portion other than the upstream opening end portion 363.

In the embodiment shown in FIG. 1, the third inner wall surface 373 is an end surface of the upstream opening end portion 363. The second inner wall surface 372 is an inner wall surface connected to the third inner wall surface 373 and the first inner wall surface 371. The first inner wall surface 371 is a bottom surface of a stepped portion 37 disposed to be recessed between the third inner wall surface 373 and the one side X1, and is a stepped surface connected to the second inner wall surface 372 and the bore inner wall surface 361.

As shown in FIG. 1, the variable nozzle device 15 is disposed so as to surround the periphery (the outer side in the radial direction Y) of the wheel housing chamber 34 for housing the turbine wheel 11. The above-described variable nozzle device 15 is disposed on the inner side of the scroll channel 31 in the radial direction Y.

The variable nozzle device 15 is configured to define the exhaust gas channel 32 (nozzle channel) for introducing the exhaust gas from the scroll channel 31 to the turbine wheel 11. The exhaust gas channel 32 is disposed upstream of the wheel housing chamber 34 in the flowing direction of the exhaust gas, and communicates with the scroll channel 31 and the wheel housing chamber 34. Further, the variable nozzle device 15 is configured to be able to adjust the flow of the exhaust gas from the scroll channel 31 to the turbine wheel 11 by a nozzle vane 21.

As shown in FIG. 1, the variable nozzle device 15 includes a nozzle mount 4, a nozzle plate 5, the at least one nozzle vane 21 which is disposed on the above-described exhaust gas channel 32 defined by the nozzle mount 4 and the nozzle plate 5, at least one nozzle support 22 for supporting the nozzle plate 5 away from the nozzle mount 4, and a variable nozzle mechanism 23 configured to be able to adjust a vane angle of the at least one nozzle vane 21. The nozzle mount 4 and the nozzle plate 5 are supported in the turbine housing 3. The above-described exhaust gas channel 32 is defined by the nozzle mount 4 and the nozzle plate 5.

As shown in FIG. 1, the nozzle mount 4 is an annular body extending along the direction intersecting with (orthogonal to) the axis LA. The nozzle mount 4 has a bearing-side channel wall surface 42 defining a part of the exhaust gas channel 32 on one side (one side X1) in a thickness direction. The above-described bearing-side channel wall surface 42 extends along the direction intersecting with (orthogonal to) the axis LA.

In the illustrated embodiment, the nozzle mount 4 is supported in the turbine housing 3 with an outer peripheral edge portion 41 of the nozzle mount 4 being held from both sides in the axial direction X by the turbine housing 3 and the bearing housing 14. Further, an annular back plate 24 is disposed between the bearing housing 14 and an inner peripheral edge portion 43 of the nozzle mount 4.

As shown in FIG. 1, the nozzle plate 5 includes an annular plate portion 51 extending along the direction intersecting with (orthogonal to) the axis LA, and a tubular portion 52 extending from an inner peripheral end portion 55 on a back surface 54 of the annular plate portion 51 toward the first inner wall surface 371 of the turbine housing 3.

The annular plate portion 51 of the nozzle plate 5 has a channel wall surface 53 (turbine-side channel wall surface) defining a part of the exhaust gas channel 32 on one side in the thickness direction (the another side X2 in the axial direction X), and has the above-described back surface 54 on another side (one side X1) in the thickness direction. Each of the channel wall surface 53 and the back surface 54 extends along the direction intersecting with (orthogonal to) the axis LA. Further, the tubular portion 52 of the nozzle plate 5 extends along the axial direction X.

In the illustrated embodiment, the above-described wheel housing chamber 34 is defined by an inner peripheral surface 56 of the tubular portion 52 of the nozzle plate 5, a turbine-side end surface 141 of the bearing housing 14 on the one side X1, and a surface 241 of the back plate 24 on the one side X1.

The nozzle support 22 is formed into a rod shape extending along the axial direction X, mechanically coupled to the nozzle plate 5 at an end portion 221 on the one side X1, and mechanically coupled to the nozzle mount 4 at an end portion 222 on the another side X2. Thus, the nozzle plate 5 is supported in the turbine housing 3 by the nozzle support 22 and the nozzle mount 4.

The exhaust gas discharged from the engine 18 passes through the exhaust gas introduction port 301, the scroll channel 31, and the exhaust gas channel 32 of the turbine housing 3 in the above-described order, and is then sent to the turbine wheel 11 (wheel housing chamber 34). The exhaust gas sent to the turbine wheel 11 (wheel housing chamber 34) flows through the exhaust gas discharge channel 33 to the one side X1 along the axial direction X, and is then discharged from the exhaust gas discharge port 302 to the outside of the turbine housing 3.

The variable nozzle device 15 can increase/decrease a channel area of the exhaust gas channel 32 by adjusting the vane angle of the nozzle vane 21 with the variable nozzle mechanism 23 and along therewith, can regulate a pressure of air supplied to the engine 18 (see FIG. 2) by changing a flow velocity and a supply amount of the exhaust gas sent to the turbine wheel 11.

Figure 3:
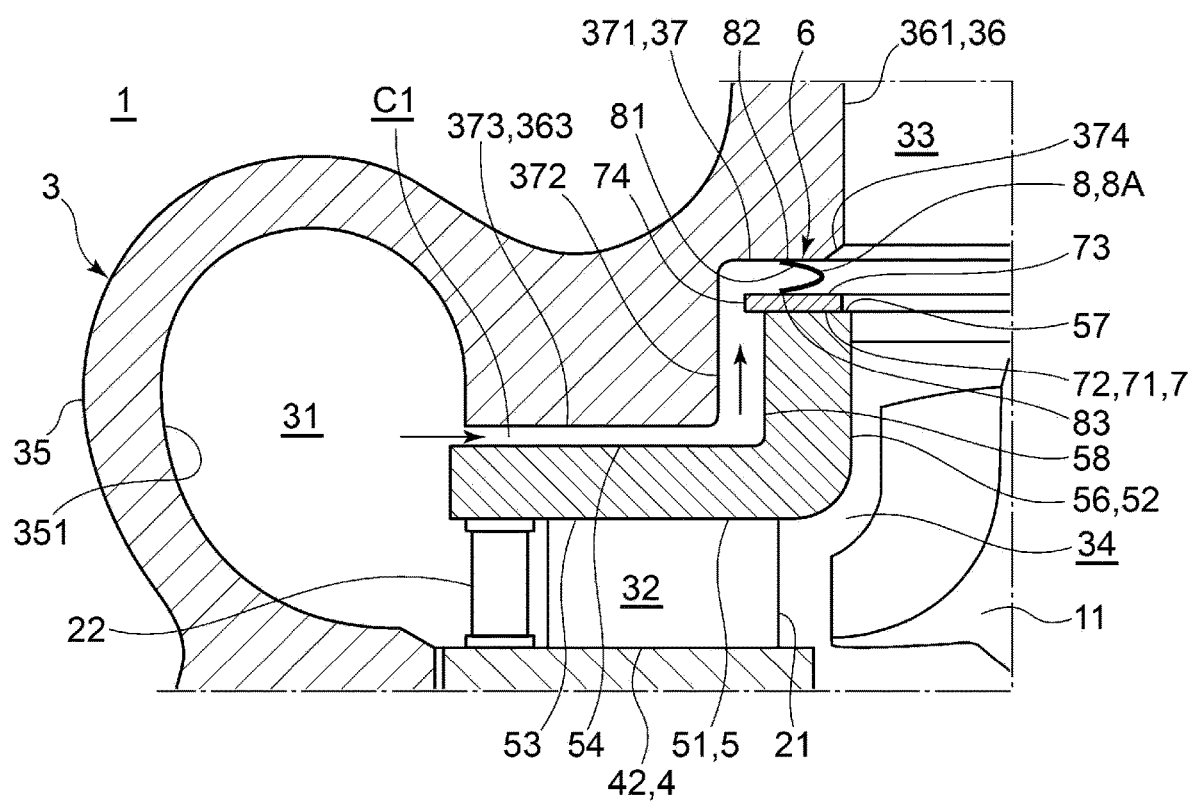
FIG. 3 is a schematic cross-sectional view of the sealing structure according to the first embodiment of the present invention.
Figure 3:
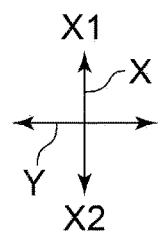
Figure 4:
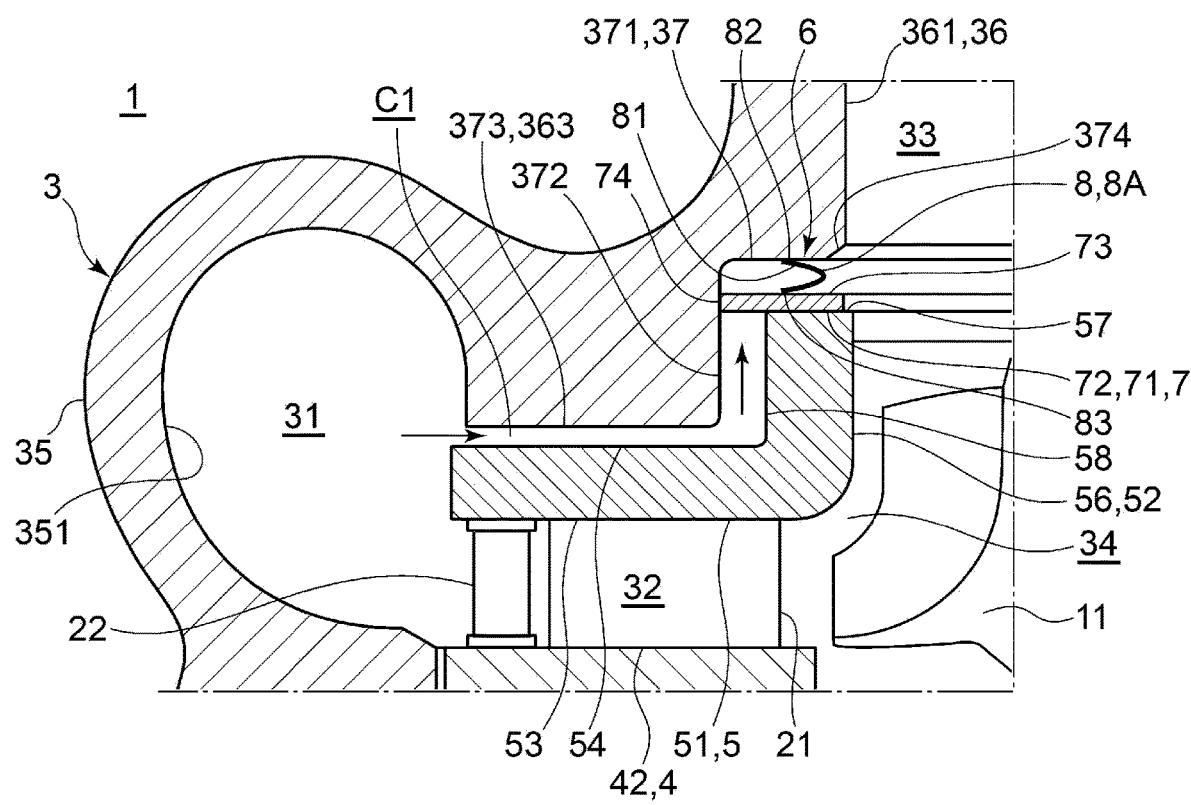
FIG. 4 is a schematic cross-sectional view of the sealing structure according to the second embodiment of the present invention, for describing a first plate member contacting a second inner wall surface.
Figure 5:
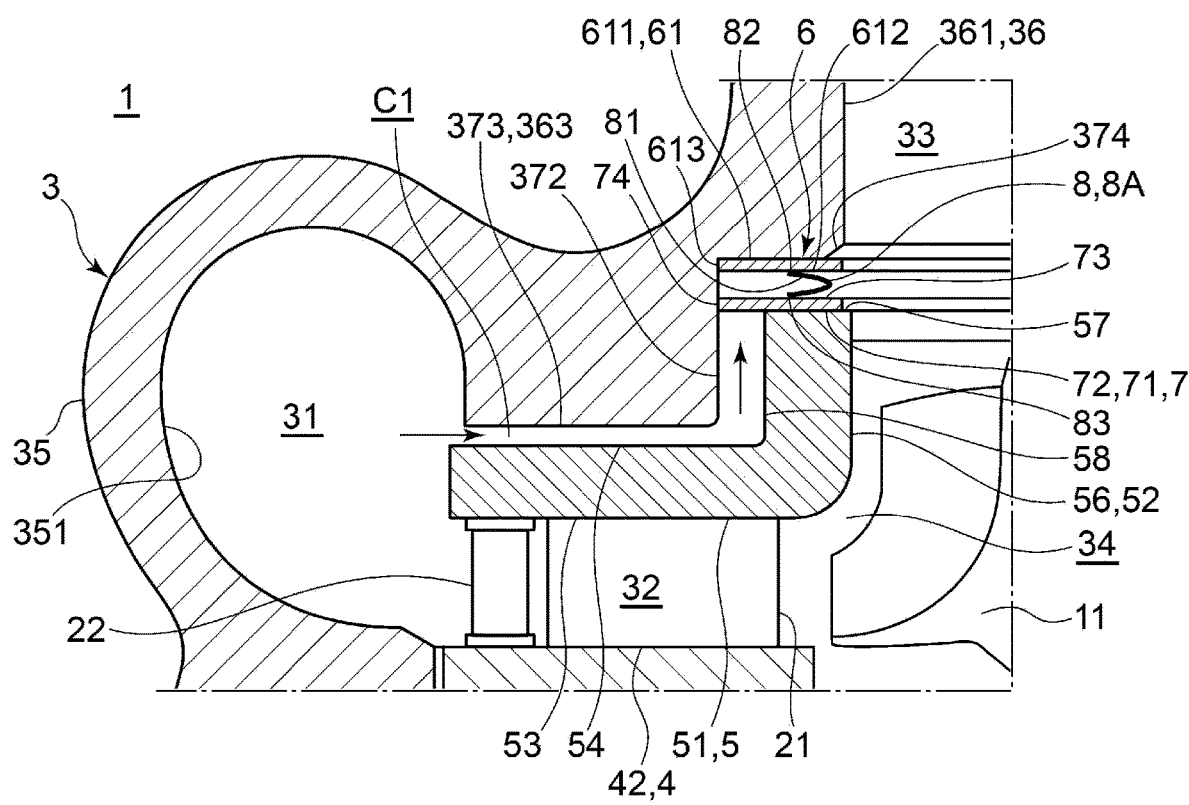
FIG. 5 is a schematic cross-sectional view of the sealing structure according to the third embodiment of the present invention, for describing a second plate member.
Figure 5:
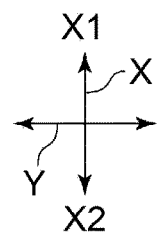
Figure 6:
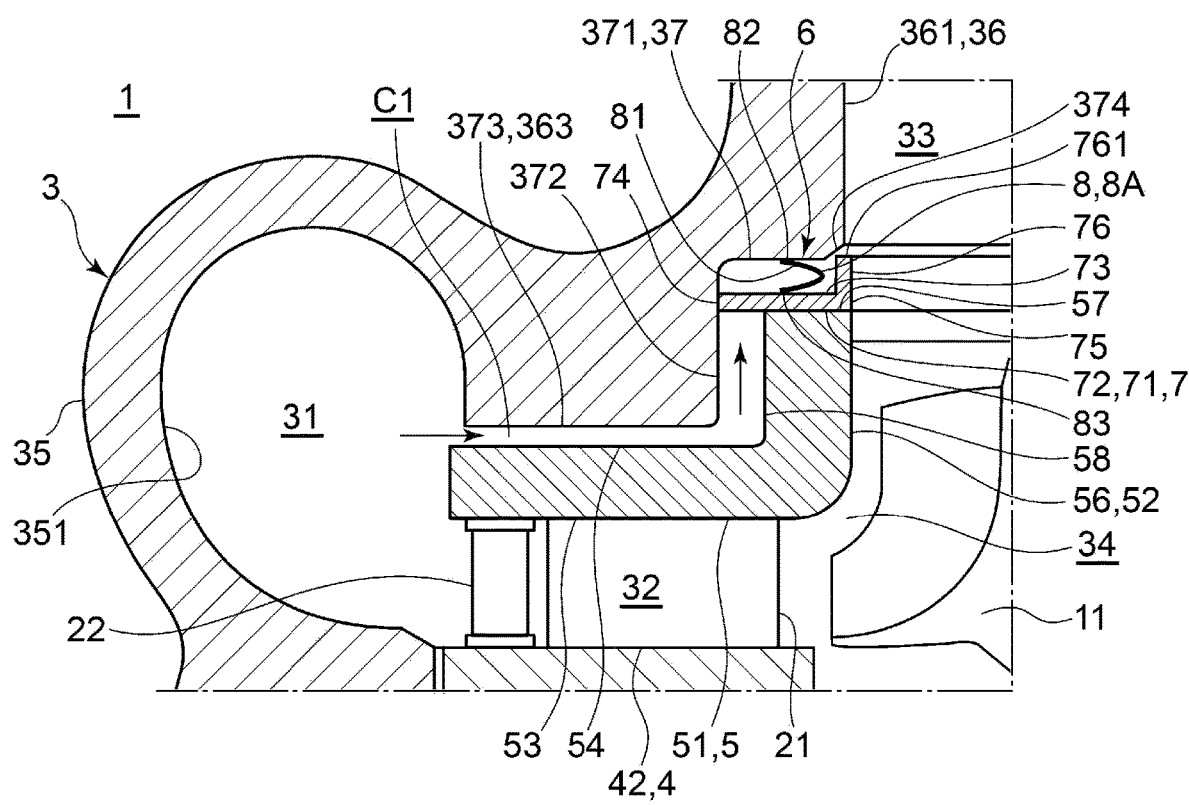
FIG. 6 is a schematic cross-sectional view of the sealing structure according to the fourth embodiment of the present invention, for describing the first plate member including an axial plate portion.
Figure 6:
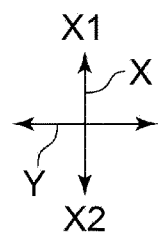
Figure 7:
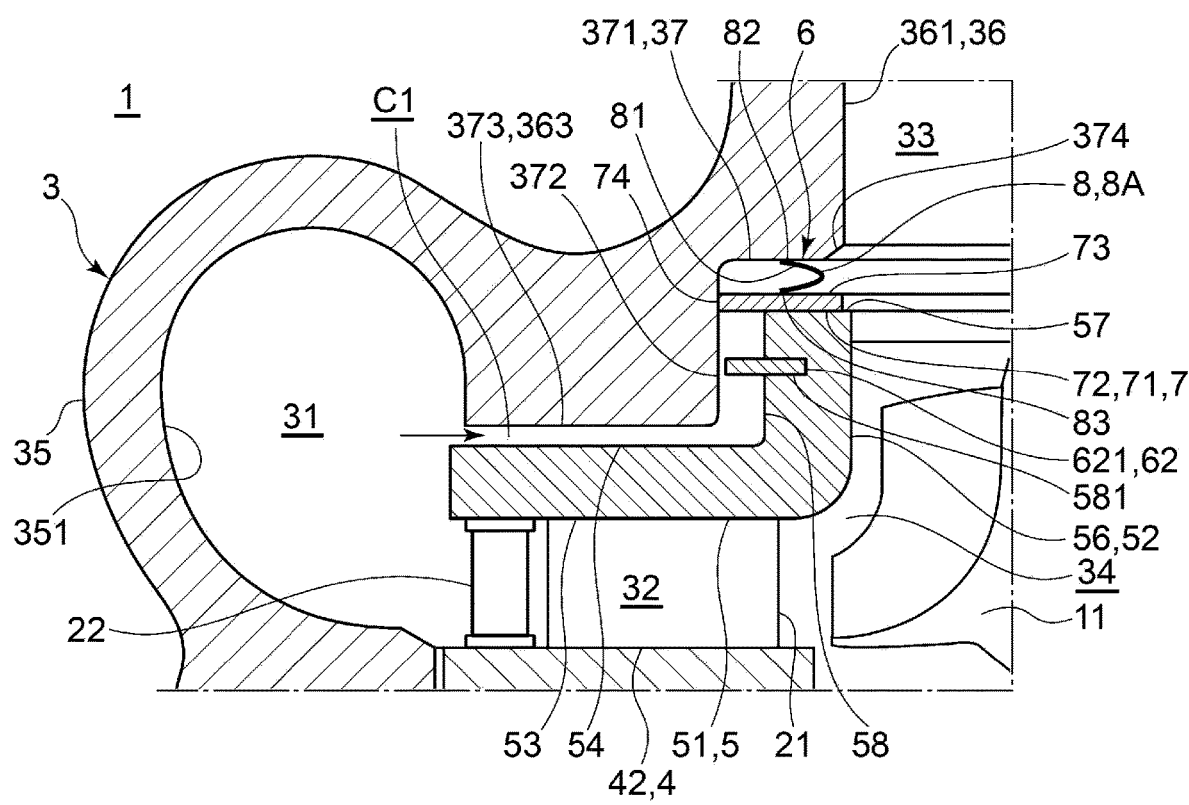
FIG. 7 is a schematic cross-sectional view of the sealing structure according to the fifth embodiment of the present invention, for describing a third plate member.
Figure 7:
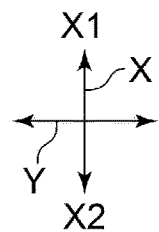

FIG. 3 is a schematic cross-sectional view of the sealing structure according to the first embodiment of the present invention. FIG. 4 is a schematic cross-sectional view of the sealing structure according to the second embodiment of the present invention, for describing a first plate member contacting a second inner wall surface. FIG. 5 is a schematic cross-sectional view of the sealing structure according to the third embodiment of the present invention, for describing a second plate member. FIG. 6 is a schematic cross-sectional view of the sealing structure according to the fourth embodiment of the present invention, for describing the first plate member including an axial plate portion. FIG. 7 is a schematic cross-sectional view of the sealing structure according to the fifth embodiment of the present invention, for describing a third plate member.

As shown in FIGS. 3 to 7, the sealing structure 1 of the turbocharger 10 according to some embodiments includes the above-described turbine housing 3 including the scroll channel 31, the above-described nozzle mount 4 supported in the turbine housing 3, the above-described nozzle plate 5 defining the exhaust gas channel 32 with the nozzle mount 4, and including the above-described annular plate portion 51 and the above-described tubular portion 52, and a sealing device 6 for sealing a section between the first inner wall surface 371 and the end surface 57 of the tubular portion 52.

As shown in FIGS. 3 to 7, the sealing device 6 is a device for suppressing that the exhaust gas flowing through the scroll channel 31 passes through a clearance C1 formed between the turbine housing 3 and the nozzle plate 5 without via the exhaust gas channel 32 and the turbine wheel 11 (wheel housing chamber 34), and flows out to the exhaust gas discharge channel 33.

In some embodiments, as shown in FIGS. 3 to 7, the above-described sealing device 6 includes a first plate member 7 which has one surface 72 contacting an end surface 57 of the tubular portion 52, and a sealing member 8 for sealing a section between the first inner wall surface 371 and another surface 73 of the first plate member 7. The sealing member 8 is configured to bias the first plate member 7 toward the end surface 57 of the tubular portion 52.

In the illustrated embodiment, for example, as shown in FIG. 3, the first plate member 7 is formed into an annular shape. The first plate member 7 is configured to have an outer diameter larger than an outer peripheral surface 58 of the tubular portion 52, and is configured to have an inner diameter larger than an inner peripheral surface 56 of the tubular portion 52.

In some other embodiments, the first plate member 7 may be formed into an arc shape extending along the circumferential direction, or may be formed into a spiral shape would at least one round along the circumferential direction. Alternatively, the first plate member 7 may be configured to have an outer diameter which is the same as the outer peripheral surface 58 of the tubular portion 52 or smaller than the outer peripheral surface 58, or may be configured to have an inner diameter which is the same as the inner peripheral surface 56 of the tubular portion 52 or smaller than the inner peripheral surface 56.

In the illustrated embodiment, for example, as shown in FIG. 3, the sealing member 8 is formed into an annular shape, and is configured to elastically be deformed when compressed along the axial direction X. The sealing member 8 is disposed at a position in the axial direction X corresponding to the end surface 57 of the tubular portion 52 in a state where the sealing member 8 is compressed along the axial direction X. That is, the sealing member 8 is located between the end surface 57 of the tubular portion 52 and a section of the first inner wall surface 371 facing the above-described end surface 57.

In the illustrated embodiment, for example, as shown in FIG. 3, the sealing member 8 (8A) is formed into a V-shape where a cross-sectional shape of the sealing member 8 has an opening 81 on the outer side in the radial direction Y. In some other embodiments, the sealing member 8 may be formed into a U-shape or a J-shape (see FIGS. 8 to 13 to be described later) where the cross-sectional shape of the sealing member 8 has the opening 81 on the outer side in the radial direction Y.

For example, as shown in FIG. 3, the nozzle plate 5 faces a space through which the high-temperature exhaust gas flows, such as the exhaust gas channel 32 or the wheel housing chamber 34. Accordingly, the nozzle plate 5 has a larger amount of thermal energy received from the exhaust gas, and thus has a larger thermal deformation amount than the section with the first inner wall surface 371 of the turbine housing 3 defining the above-described clearance C1. Thus, in operation of the turbocharger 10, a relative positional relationship between the first inner wall surface 371 of the turbine housing 3 and the end surface 57 of the tubular portion 52 of the nozzle plate 5 changes.

With the above configuration, since the first plate member 7 is supported between the sealing member 8 and the nozzle plate 5 by being biased toward the end surface 57 of the tubular portion 52 of the nozzle plate 5 with the sealing member 8, the one surface 72 of the first plate member 7 is swingable with respect to the end surface 57 of the tubular portion 52. The sealing structure 1 can suppress the change in relative positional relationship between the first inner wall surface 371 of the turbine housing 3 and the another surface 73 of the first plate member 7 by sliding the nozzle plate 5 with respect to the first plate member 7 upon reception of heat from the exhaust gas. By suppressing the change in relative positional relationship between the first inner wall surface 371 of the turbine housing 3 and the another surface 73 of the first plate member 7, it is possible to suppress deformation and wear of the sealing member 8 for sealing the section between the first inner wall surface 371 of the turbine housing 3 and the another surface 73 of the first plate member 7.

Further, the first plate member 7 blocks heat (shields heat) from the nozzle plate 5 and the exhaust gas flowing from the scroll channel 31 to prevent the heat from being transmitted to the sealing member 8, making it possible to suppress thermal expansion and thermal contraction of the sealing member 8, and thus to suppress a decrease in sealing performance due to fatigue of the sealing member 8. Thus, with the sealing structure 1, it is possible to exert stable sealing performance over a long period of time.

In some embodiments, the above-described first plate member 7 is formed by a material whose linear expansion coefficient is similar to that of the above-described turbine housing 3 (more specifically, a difference in linear expansion coefficient between the turbine housing 3 and the first plate member 7 is within ±10%). In this case, it is possible to make the first plate member land the first inner wall surface 371 a uniform thermal deformation amount, making it possible to effectively suppress the change in relative positional relationship between the first inner wall surface 371 of the turbine housing 3 and the another surface 73 of the first plate member 7.

In some embodiments, as shown in FIGS. 4 to 7, the above-described first plate member 7 includes a radial plate portion 71 extending toward the second inner wall surface 372 of the turbine housing 3. The radial plate portion 71 has an outer end surface 74 configured to contact the second inner wall surface 372.

In the illustrated embodiment, the radial plate portion 71 has the above-described another surface 73 on the one side (one side X1) of the thickness direction and the above-described one surface 72 on the another side (another side X2) in the thickness direction.

With the above configuration, since the outer end surface 74 of the radial plate portion 71 is in contact with the second inner wall surface 372 of the turbine housing 3, extension of the first plate member 7 to the outer side in the radial direction Y upon reception of heat from the exhaust gas is restricted. As a result, it is possible to make the turbine housing 3 and the first plate member 7 a uniform thermal deformation amount in the radial direction, upon reception of heat from the exhaust gas. Making the turbine housing 3 and the first plate member 7 the uniform thermal deformation amount in the radial direction, the sealing structure 1 can more effectively suppress the change in relative positional relationship between the first inner wall surface 371 of the turbine housing 3 and the another surface 73 of the first plate member 7 upon reception of heat from the exhaust gas, and thus to suppress deformation and wear of the sealing member 8 more effectively.

Further, since the outer end surface 74 of the radial plate portion 71 is in contact with the second inner wall surface 372 of the turbine housing 3, the first plate member 7 can prevent the exhaust gas that does not pass through the turbine wheel 11 from contacting the sealing member 8, making it possible to suppress thermal expansion and thermal contraction of the sealing member 8 more effectively.

In some embodiments, as shown in FIG. 3, 4, 6, 7, the above-described sealing member 8 is configured to contact the first inner wall surface 371.

In the illustrated embodiment, the sealing member 8 (8A) has opening end portions 82, 83, the end portion 82 on the one side X1 contacts the first inner wall surface 371, and the end portion 83 on the another side X2 contacts the another surface 73 of the first plate member 7. With an elastic force (restoring force), the sealing member 8 biases the first plate member 7 toward the end surface 57 of the tubular portion 52, and biases the first inner wall surface 371 toward the one side X1.

With the above configuration, configured to contact the first inner wall surface 371, the sealing member 8 can seal the section between the first inner wall surface 371 and the another surface 73 of the first plate member 7.

In some embodiments, as shown in FIG. 5, the above-described sealing device 6 further includes a second plate member 61 with one surface 611 contacting the first inner wall surface 371, and the sealing member 8 is configured to contact another surface 612 of the second plate member 61.

In the illustrated embodiment, as shown in FIG. 5, the second plate member 61 is formed into an annular shape. The second plate member 61 is configured to have an outer diameter larger than the outer peripheral surface 58 of the tubular portion 52, and is configured to have an inner diameter larger than the inner peripheral surface 56 of the tubular portion 52. The second plate member 61 has an outer end surface 613 configured to contact the second inner wall surface 372.

In some other embodiments, the second plate member 61 may be formed into an arc shape extending along the circumferential direction, or may be formed into a spiral shape would at least one round along the circumferential direction. Alternatively, the second plate member 61 may be configured to have an outer diameter which is the same as the outer peripheral surface 58 of the tubular portion 52 or smaller than the outer peripheral surface 58, or may be configured to have an inner diameter which is the same as the inner peripheral surface 56 of the tubular portion 52 or smaller than the inner peripheral surface 56. Further, the outer end surface 613 of the second plate member 61 may have a clearance between the outer end surface 613 and the second inner wall surface 372.

In the embodiment shown in FIG. 5, the sealing member 8 (8A) has the opening end portions 82, 83, the end portion 82 on the one side X1 contacts the another surface 612 of the second plate member 61, and the end portion 83 on the another side X2 contacts the another surface 73 of the first plate member 7. With the elastic force (restoring force), the sealing member 8 biases the first plate member 7 toward the end surface 57 of the tubular portion 52, and biases the second plate member 61 and the first inner wall surface 371 toward the one side X1.

With the above configuration, configured to contact the another surface 612 of the second plate member 61 with the one surface 611 contacting the first inner wall surface 371, the sealing member 8 can block heat (shield heat) from the turbine housing 3 by the second plate member 61. Blocking the heat from the turbine housing 3, it is possible to suppress thermal expansion and thermal contraction of the sealing member 8, and thus to suppress the decrease in sealing performance due to fatigue of the sealing member 8.

In some embodiments, the above-described second plate member 61 is formed by a material whose linear expansion coefficient is similar to that of the above-described first plate member 7 (more specifically, a difference in linear expansion coefficient between the first plate member 7 and the second plate member 61 is within ±10%). In this case, it is possible to make the first plate member land the second plate member 61 a uniform thermal deformation amount, making it possible to effectively suppress the change in relative positional relationship between the another surface 73 of the first plate member 7 and the another surface 612 of the second plate member 61.

In some embodiments, as shown in FIG. 6, the above-described first plate member 7 includes the above-described radial plate portion 71 extending toward the second inner wall surface 372 of the turbine housing 3, and the axial plate portion 76 extending from the inner end portion 75 of the radial plate portion 71 toward the first inner wall surface 371.

With the above configuration, since the first plate member 7 includes the axial plate portion 76 extending from the inner end portion 75 of the radial plate portion 71 toward the first inner wall surface 371, by narrowing the clearance between the first plate member 7 and the turbine housing 3 with the axial plate portion 76, it is possible to suppress that the exhaust gas having passed through the turbine wheel 11 flows toward the sealing member 8 through the clearance. By suppressing that the exhaust gas having passed through the turbine wheel 11 contacts the sealing member 8, it is possible to suppress thermal expansion and thermal contraction of the sealing member 8 more effectively.

In some embodiments, as shown in FIG. 6, between the first inner wall surface 371 and the bore inner wall surface 361, a notched surface 374 is formed which extends along a direction intersecting with the first inner wall surface 371 and the bore inner wall surface 361. The first inner wall surface 371 is connected to the bore inner wall surface 361 via the notched surface 374. The axial plate portion 76 extends to a space notched by the notched surface 374 along the axial direction X. The axial plate portion 76 has a downstream end 761 located between the first inner wall surface 371 and the one side X1 in the axial direction X, and a part of the downstream end 761 faces the notched surface 374. In the illustrated embodiment, the downstream end 761 does not contact the notched surface 374, but has a clearance between the notched surface 374 and the downstream end 761.

With the above configuration, since the axial plate portion 76 of the first plate member 7 extends to the space notched by the notched surface 374, it is possible to further narrow the clearance between the first plate member 7 and the turbine housing 3 by the axial plate portion 76. With the above-described first plate member 7, it is possible to effectively suppress that the exhaust gas having passed through the turbine wheel 11 flows toward the sealing member 8 through the clearance.

In some embodiments, as shown in FIG. 7, the above-described sealing device 6 further includes a third plate member 62 mounted to the outer peripheral surface 58 of the tubular portion 52 and extending toward the second inner wall surface 372 of the turbine housing 3.

In the illustrated embodiment, as shown in FIG. 7, the third plate member 62 has an inner end portion 621 that fits into an outer peripheral groove portion 581 formed in the outer peripheral surface 58 of the tubular portion 52 along the circumferential direction, thereby being supported by the nozzle plate 5. The third plate member 62 is configured to be detachable from the outer peripheral groove portion 581. In a certain embodiment, the third plate member 62 is constituted by a plate-like member formed into an arc shape extending along the circumferential direction. Alternatively, in a certain embodiment, the third plate member 62 is constituted by a seal ring formed into a spiral shape would at least one round along the circumferential direction.

With the above configuration, since the sealing device 6 includes the third plate member 62 extending toward the second inner wall surface 372 of the turbine housing 3, by narrowing the clearance between the nozzle plate 5 and the second inner wall surface 372 of the turbine housing 3 with the third plate member 62, it is possible to suppress the flow rate of the exhaust gas flowing toward the sealing member 8 through the above-described clearance. Suppressing the flow rate of the exhaust gas flowing toward the sealing member 8, it is possible to reduce the amount of the thermal energy applied from the exhaust gas to the sealing member 8, and to suppress thermal expansion and thermal contraction of the sealing member 8.

In some embodiments, the cross-sectional shape of the above-described sealing member 8 is formed into a U-shape, a V-shape, or a J-shape having the opening 81 on the outer side in the radial direction Y.

With the above configuration, since the cross-sectional shape of the sealing member 8 is formed into the U-shape, the V-shape, or the J-shape having the opening 81 on the radially outer side, the opening 81 of the sealing member 8 is directed to the side of the scroll channel 31 when the sealing member 8 seals the section between the first inner wall surface 371 and the another surface 73 of the first plate member 7. Thus, the opening 81 is expanded by a pressure of the exhaust gas in the scroll channel 31, the sealing member 8 can effectively seal the section between the first inner wall surface 371 and the end surface 57 of the tubular portion 52.

In some embodiments, as shown in FIGS. 8 to 13 to be described later, the cross-sectional shape of the above-described sealing member 8 (8B) is formed into the J-shape having the opening 81 on the outer side in the radial direction Y. In the illustrated embodiment, the sealing member 8 (8B) has the opening end portions 82, 83, the end portion 82 on the one side X1 is configured to be longer than the end portion 83 on the another side X2, and the outer end portion of the end portion 82 is located on the outer side of the outer end portion of the end portion 83 in the radial direction Y. In this case, since the cross-sectional shape of the sealing member 8 (8B) is formed into the J-shape, as compared with a case where the cross-sectional shape of the sealing member 8 (8B) is formed into the U-shape or the V-shape, it is possible to increase a contact area of the end portion 82 having the longer length with the first inner wall surface 371, making it possible to stably generate the elastic force (restoring force) over a long period of time.

Figure 8:
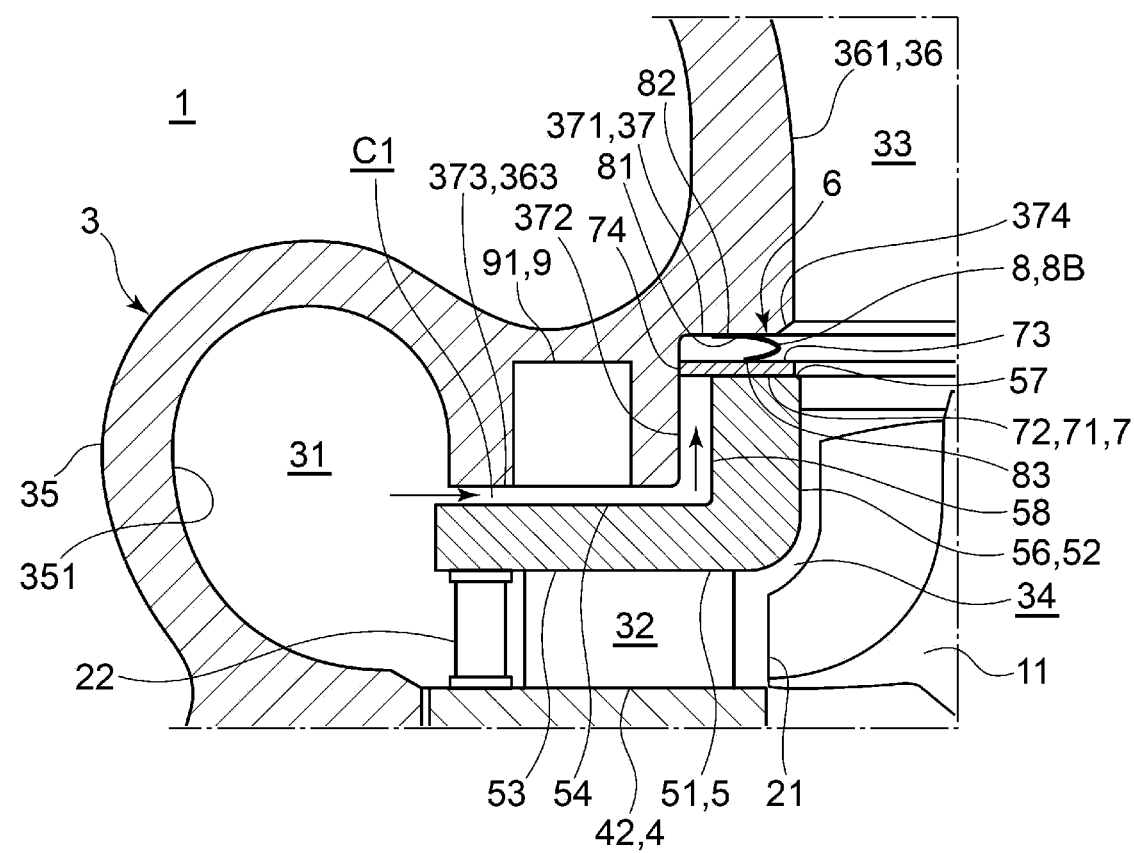
FIG. 8 is a schematic cross-sectional view of the sealing structure according to the sixth embodiment of the present invention.
Figure 8:
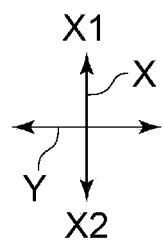
Figure 9:
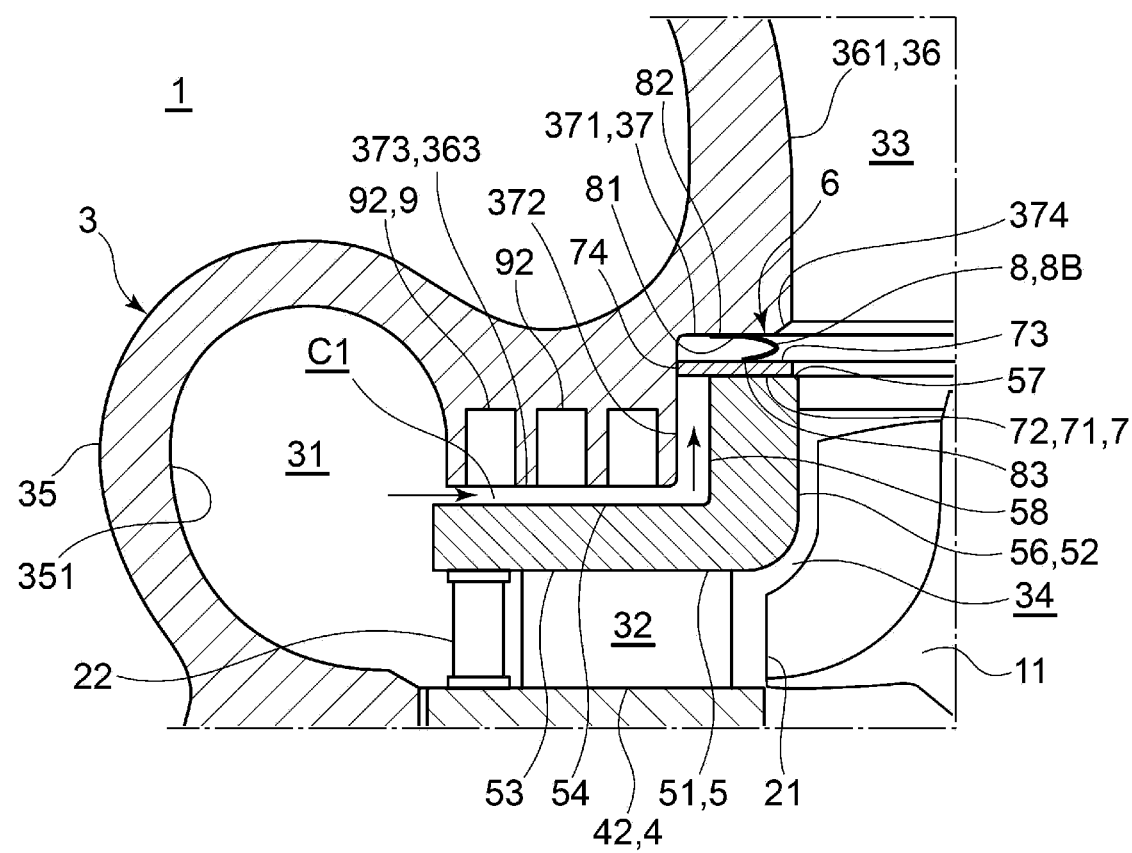
FIG. 9 is a schematic cross-sectional view showing a first modified example of the sealing structure according to the sixth embodiment.
Figure 9:
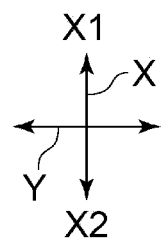
Figure 10:
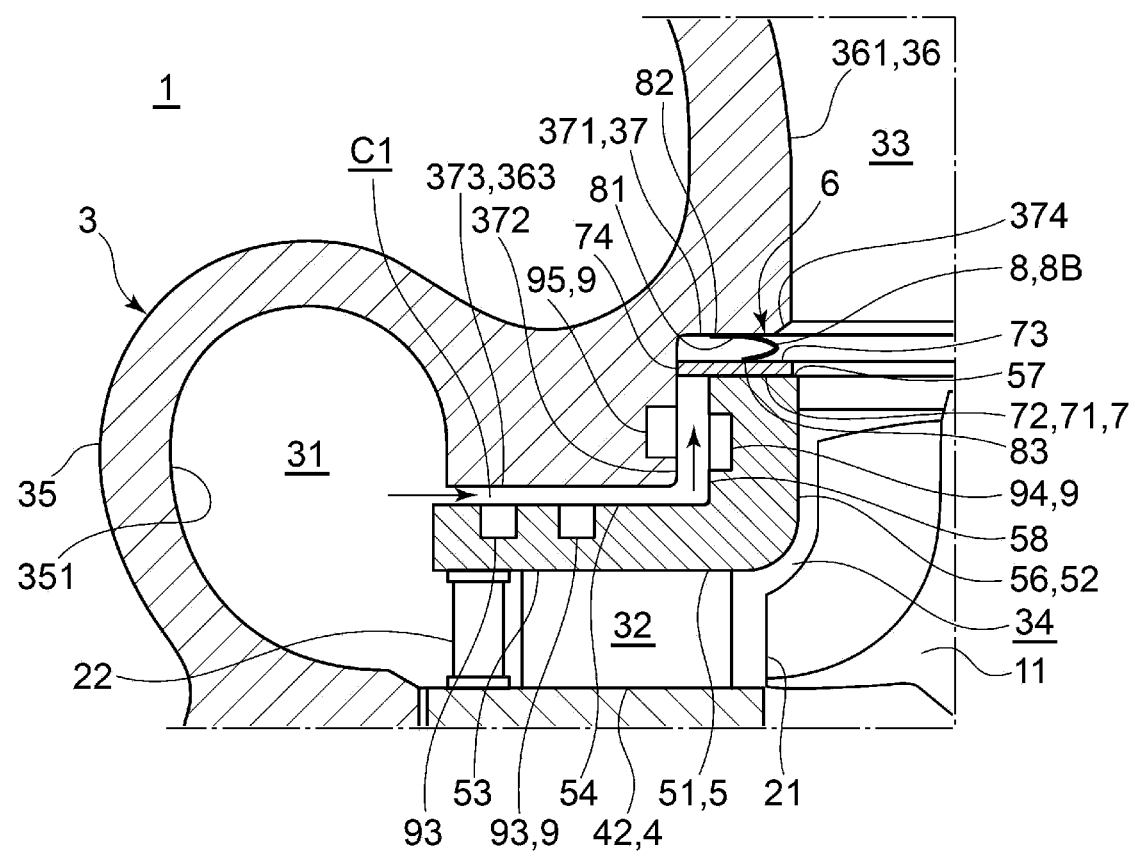
FIG. 10 is a schematic cross-sectional view showing a second modified example of the sealing structure according to the sixth embodiment.
Figure 10:
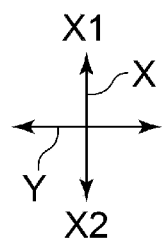
Figure 11:
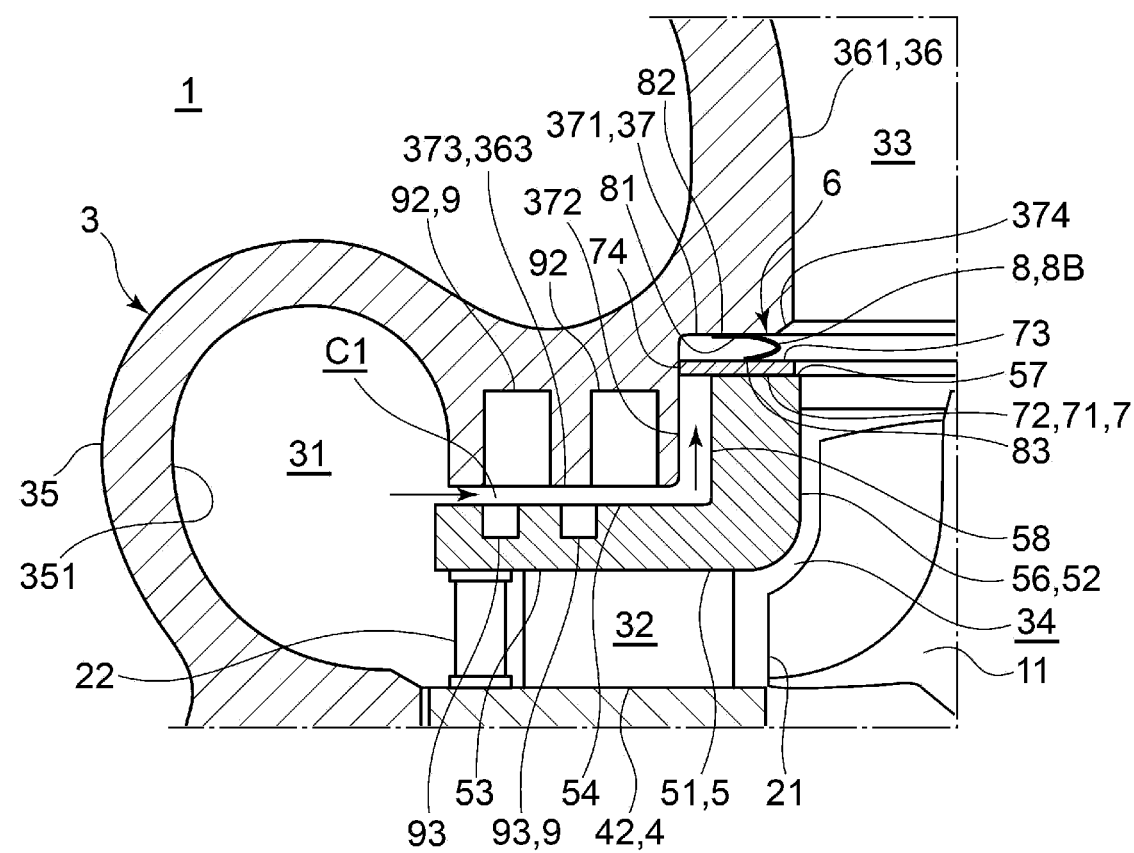
FIG. 11 is a schematic cross-sectional view showing a third modified example of the sealing structure according to the sixth embodiment.
Figure 11:
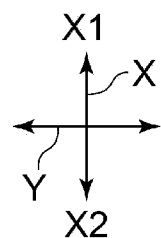

FIG. 8 is a schematic cross-sectional view of the sealing structure according to the sixth embodiment of the present invention. FIG. 9 is a schematic cross-sectional view showing a first modified example of the sealing structure according to the sixth embodiment. FIG. 10 is a schematic cross-sectional view showing a second modified example of the sealing structure according to the sixth embodiment. FIG. 11 is a schematic cross-sectional view showing a third modified example of the sealing structure according to the sixth embodiment.

In some embodiments, as shown in FIGS. 8 to 11, the above-described turbine housing 3 includes the above-described second inner wall surface 372 and the above-described third inner wall surface 373. In at least one of the second inner wall surface 372 and the third inner wall surface 373 of the turbine housing 3, as well as the outer peripheral surface 58 of the tubular portion 52 and the back surface 54 of the annular plate portion 51 of the nozzle plate 5 described above, at least one groove portion 9 extending along the circumferential direction is formed.

In the illustrated embodiment, the at least one groove portion 9 is formed to have a rectangular cross-sectional shape in the cross-section along the axis LA. Further, the at least one groove portion 9 is formed into an annular shape. In another embodiment, the at least one groove portion 9 may be formed into a cross-sectional shape other than the rectangular shape, or may be formed into an arc shape.

In the embodiment shown in FIG. 8, the above-described at least one groove portion 9 includes one third inner wall surface-side groove portion 91 formed in the above-described third inner wall surface 373.

In the embodiment shown in FIG. 9, the above-described at least one groove portion 9 includes a plurality of third inner wall surface-side groove portions 92 disposed in the above-described third inner wall surface 373 at intervals from one another in the radial direction Y. The above-described third inner wall surface-side portion 91 can have a larger cross-sectional area in the above-described cross-section than the third inner wall surface-side groove portions 92.

In the embodiment shown in FIG. 10, the above-described at least one groove portion 9 includes a plurality of back surface-side groove portions 93 disposed in the back surface 54 of the annular plate portion 51 at intervals from one another in the radial direction, an outer peripheral surface-side groove portion 94 formed in the outer peripheral surface 58 of the tubular portion 52, and a second inner wall surface-side groove portion 95 formed in a section of the second inner wall surface 372 between the end surface 57 of the tubular portion 52 and the another side X2 in the axial direction X.

In the embodiment shown in FIG. 11, the above-described at least one groove portion 9 includes the above-described plurality of third inner wall surface-side groove portions 92 and the above-described plurality of back surface-side groove portions 93.

With the above configuration, since in the least one of the second inner wall surface 372 and the third inner wall surface 373 of the turbine housing 3, as well as the outer peripheral surface 58 of the tubular portion 52 and the back surface 54 of the annular plate portion 51 of the nozzle plate 5, the at least one groove portion 9 extending along the circumferential direction is formed, by expanding the exhaust gas flowing from the scroll channel 31 toward the sealing member 8 with the at least one groove portion 9 (expansion chamber) to increase a pressure loss, it is possible to suppress the flow rate of the exhaust gas flowing toward the sealing member 8. Suppressing the flow rate of the exhaust gas flowing toward the sealing member 8, it is possible to reduce the amount of the thermal energy applied from the exhaust gas to the sealing member 8, and to suppress thermal expansion and thermal contraction of the sealing member 8.

The at least one groove portion 9 in the present embodiment is combined with the above-described sealing structure 1 in the illustrated embodiment. However, the at least one groove portion 9 in the present embodiment can be implemented independently. For example, the at least one groove portion 9 in the present embodiment is applicable to, for example, a sealing structure without the above-described sealing device 6 for sealing the section between the first inner wall surface 371 and the end surface 57 of the tubular portion 52 (a structure removing the sealing device 6 from the sealing structure 1) or a sealing structure for sealing the section between the first inner wall surface 371 and the end surface 57 of the tubular portion 52 only by the sealing member 8 (a structure removing the sealing device 6 other than the sealing member 8 from the sealing structure 1).

Figure 12:
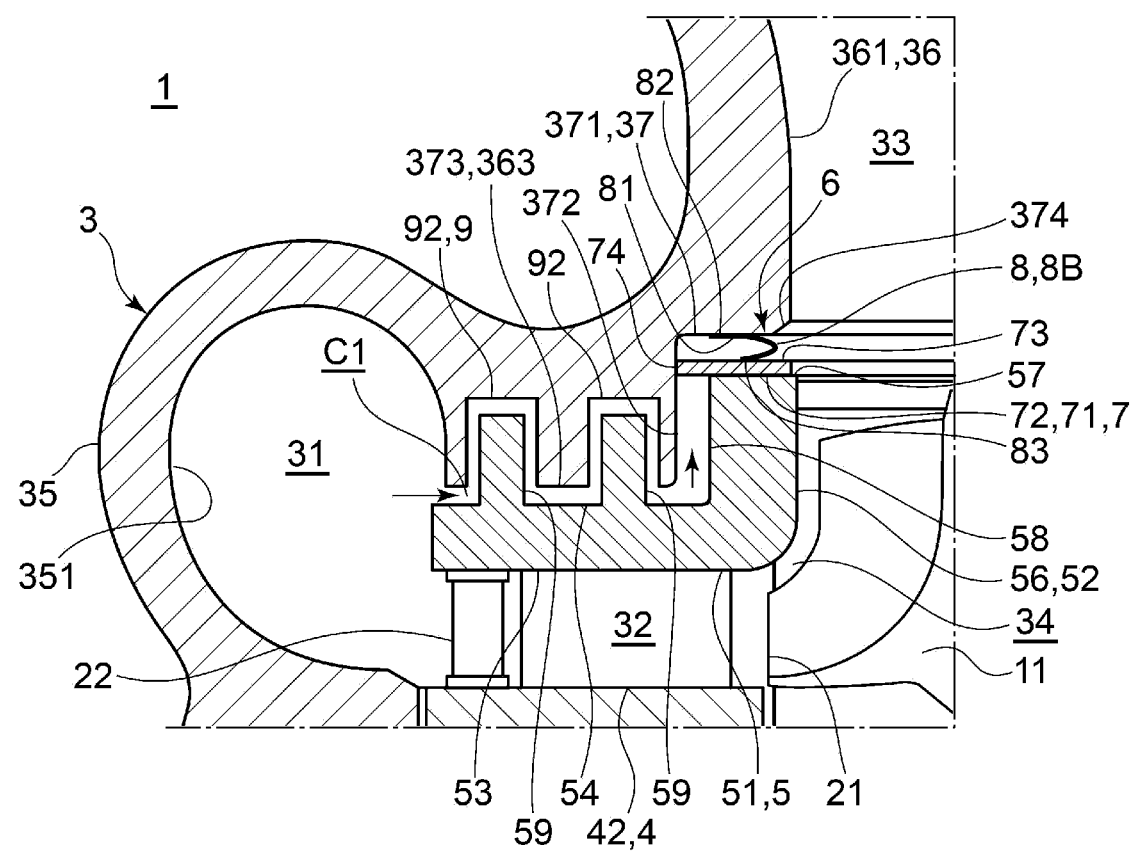
FIG. 12 is a schematic cross-sectional view of the sealing structure according to the seventh embodiment of the present invention.
Figure 13:
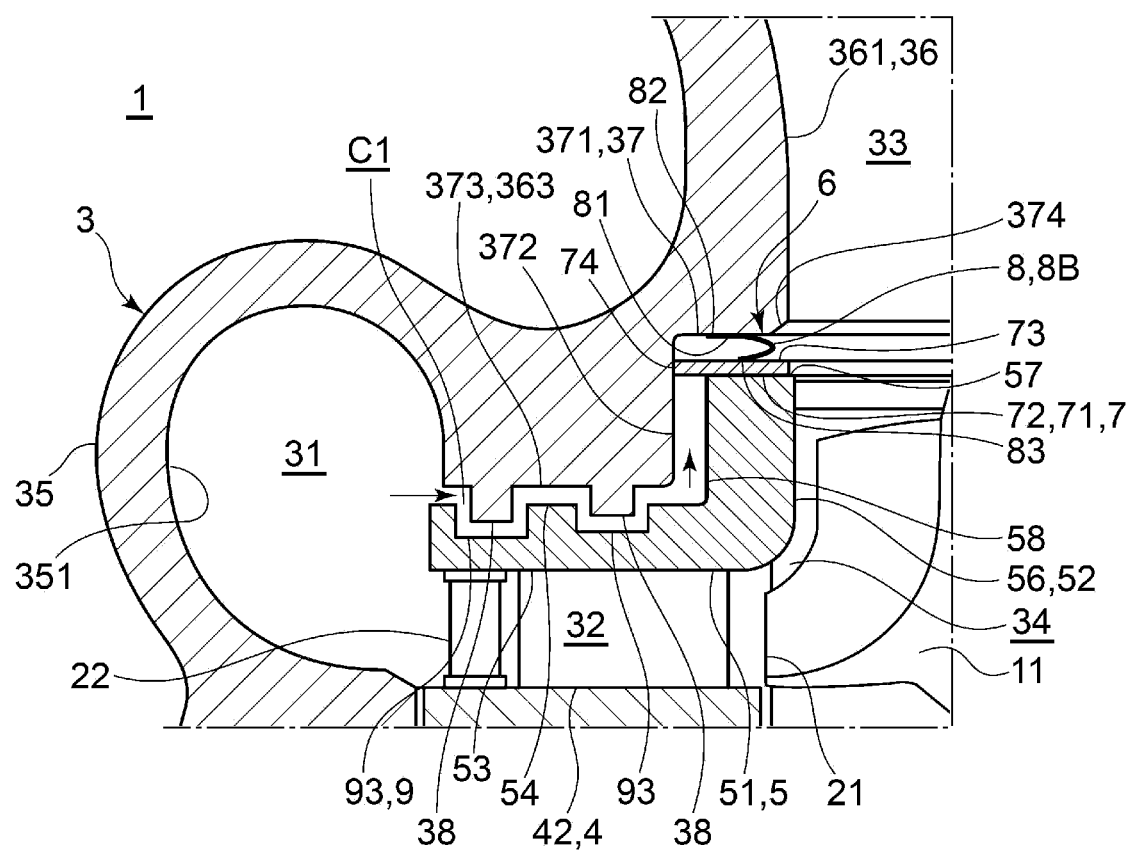
FIG. 13 is a schematic cross-sectional view of the sealing structure according to the eighth embodiment of the present invention.
Figure 13:
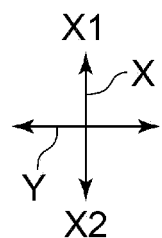

FIG. 12 is a schematic cross-sectional view of the sealing structure according to the seventh embodiment of the present invention. FIG. 13 is a schematic cross-sectional view of the sealing structure according to the eighth embodiment of the present invention.

In some embodiments, as shown in FIG. 12, the above-described turbine housing 3 includes the above-described third inner wall surface 373, and the above-described at least one groove portion 9 includes the above-described at least one third inner wall surface-side groove portion 92 formed in the third inner wall surface 373. The above-described nozzle plate 5 includes at least one nozzle plate-side protruding portion 59 protruding into the third inner wall surface-side groove portion 92 from the back surface 54.

In the illustrated embodiment, the nozzle plate-side protruding portion 59 is formed to have a rectangular cross-sectional shape in the cross-section along the axis LA. Further, the nozzle plate-side protruding portion 59 is formed into an annular shape. In another embodiment, the nozzle plate-side protruding portion 59 may be formed into a cross-sectional shape other than the rectangular shape, or may be formed into an arc shape extending along the circumferential direction.

In the illustrated embodiment, the above-described at least one third inner wall surface-side groove portion 92 includes the plurality of third inner wall surface-side groove portions 92 disposed in the above-described third inner wall surface 373 at intervals from one another in the radial direction Y, and the above-described at least one nozzle plate-side protruding portion 59 includes a plurality of nozzle plate-side protruding portions 59 protruding from sections of the back surface 54 at intervals from one another in the radial direction Y.

As the number of nozzle plate-side protruding portions 59 protruding into the third inner wall surface-side groove portion 92 increases, it is possible to increase the entire length of the clearance C1 between the turbine housing 3 and the nozzle plate 5, and to increase the number of times the flowing direction of the exhaust gas flowing through the clearance C1 is changed to the intersecting (orthogonal) direction. Thus, it is possible to suppress the flow rate of the exhaust gas flowing toward the sealing member 8.

With the above configuration, since the nozzle plate 5 includes the nozzle plate-side protruding portion 59 protruding into the third inner wall surface-side groove portion 92 from the back surface 54, by increasing the entire length of the clearance C1 between the turbine housing 3 and the nozzle plate 5 with the nozzle plate-side protruding portion 59 protruding into the third inner wall surface-side groove portion 92, it is possible to suppress the flow rate of the exhaust gas flowing toward the sealing member 8. Suppressing the flow rate of the exhaust gas flowing toward the sealing member 8, it is possible to reduce the amount of the thermal energy applied from the exhaust gas to the sealing member 8, and to suppress thermal expansion and thermal contraction of the sealing member 8.

The nozzle plate-side protruding portion 59 in the present embodiment is combined with the above-described sealing structure 1 in the illustrated embodiment. However, the nozzle plate-side protruding portion 59 in the present embodiment can be implemented independently. For example, the nozzle plate-side protruding portion 59 in the present embodiment is applicable to, for example, the structure removing the sealing device 6 from the sealing structure 1 described above or the removing the sealing device 6 other than the sealing member 8 from the sealing structure 1.

In some embodiments, as shown in FIG. 13, the above-described turbine housing 3 includes the above-described third inner wall surface 373, and the above-described at least one groove portion 9 includes the above-described at least one back surface-side groove portion 93 formed in the back surface 54 of the annular plate portion 51. The above-described turbine housing 3 includes at least one housing-side protruding portion 38 protruding into the back surface-side groove portion 93 from the third inner wall surface 373.

In the illustrated embodiment, the housing-side protruding portion 38 is formed to have a rectangular cross-sectional shape in the cross-section along the axis LA. Further, the housing-side protruding portion 38 is formed into an annular shape. In another embodiment, the housing-side protruding portion 38 may be formed into a cross-sectional shape other than the rectangular shape, or may be formed into the arc shape extending along the circumferential direction.

In the illustrated embodiment, the above-described at least one back surface-side groove portion 93 includes the plurality of back surface-side groove portions 93 disposed in the back surface 54 at intervals from one another in the radial direction Y, and the above-described at least one housing-side protruding portion 38 includes a plurality of housing-side protruding portions 38 protruding from sections of the third inner wall surface 373 at intervals from one another in the radial direction Y.

As the number of housing-side protruding portions 38 protruding into the back surface-side groove portion 93 increases, it is possible to increase the entire length of the clearance C1 between the turbine housing 3 and the nozzle plate 5, and to increase the number of times the flowing direction of the exhaust gas flowing through the clearance C1 is changed to the intersecting (orthogonal) direction. Thus, it is possible to suppress the flow rate of the exhaust gas flowing toward the sealing member 8.

With the above configuration, since the turbine housing 3 includes the housing-side protruding portion 38 protruding into the back surface-side groove portion 93 from the third inner wall surface 373, by increasing the entire length of the clearance C1 between the turbine housing 3 and the nozzle plate 5 with the housing-side protruding portion 38 protruding into the back surface-side groove portion 93, it is possible to suppress the flow rate of the exhaust gas flowing toward the sealing member 8. Suppressing the flow rate of the exhaust gas flowing toward the sealing member 8, it is possible to reduce the amount of the thermal energy applied from the exhaust gas to the sealing member 8, and to suppress thermal expansion and thermal contraction of the sealing member 8.

The housing-side protruding portion 38 in the present embodiment is combined with the above-described sealing structure 1 in the illustrated embodiment. However, the housing-side protruding portion 38 in the present embodiment can be implemented independently. For example, the housing-side protruding portion 38 in the present embodiment is applicable to, for example, the structure removing the sealing device 6 from the sealing structure 1 descried above or the structure removing the sealing device 6 other than the sealing member 8 from the sealing structure 1.

As shown in FIG. 1, the turbocharger 10 according to some embodiments includes the above-described turbine wheel 11 and the above-described sealing structure 1.

With the above configuration, the sealing structure 1 of the turbocharger 10 can exert stable sealing performance over a long period of time, making it possible to suppress a decrease in performance of the turbocharger 10 over a long period of time.

The present invention is not limited to the above-described embodiments, and also includes an embodiment obtained by modifying the above-described embodiments and an embodiment obtained by combining these embodiments as appropriate.

REFERENCE SIGNS LIST

1 Sealing structure
3 Turbine housing
301 Exhaust gas introduction port
302 Exhaust gas discharge port
31 Scroll channel
32 Exhaust gas channel
33 Exhaust gas discharge channel
34 Wheel housing chamber
35 Scroll forming portion
351 Scroll inner wall surface
36 Bore forming portion
361 Bore inner wall surface
362 Downstream opening end portion
363 Upstream opening end portion
37 Stepped portion
371 First inner wall surface
372 Second inner wall surface
373 Third inner wall surface
374 Notched surface
38 Housing-side protruding portion
4 Nozzle mount
41 Outer peripheral edge portion
42 Bearing-side channel wall surface
43 Inner peripheral edge portion
5 Nozzle plate
51 Annular plate portion
52 Tubular portion
53 Channel wall surface
54 Back surface
55 Inner peripheral end portion
56 Inner peripheral surface
57 End surface
58 Outer peripheral surface
581 Outer peripheral groove portion
59 Nozzle plate-side protruding portion
6 Sealing device
61 Second plate member
611 One surface
612 Another surface
62 Third plate member
7 First plate member
71 Radial plate portion
72 One surface
73 Another surface
74 Outer end surface
75 Inner end portion
76 Axial plate portion
761 Downstream end
8 Sealing member
81 Opening
82, 83 End portion
9 Groove portion
91, 92 Third inner wall surface-side groove portion
93 Back surface-side groove portion
94 Outer peripheral surface-side groove portion
95 Second inner wall surface-side groove portion
10 Turbocharger
11 Turbine wheel
12 Rotational shaft
121, 122 End portion
13 Bearing
14 Bearing housing
141 Turbine-side end surface
15 Variable nozzle device
16 Compressor wheel
17 Compressor housing
171 Air inlet port
172 Air supply port
18 Engine
19 Supply line
20 Discharge line
21 Nozzle vane
22 Nozzle support
221, 222 End portion
23 Variable nozzle mechanism
24 Back plate
241 Surface
C1 Clearance
LA Axis
X Axial direction
X1 One side
X2 Another side
Y Radial direction

The invention claimed is:

1. A sealing structure of a turbocharger, comprising:
a turbine housing including a scroll channel;
a nozzle mount supported in the turbine housing;
a nozzle plate defining, with the nozzle mount, an exhaust gas channel for introducing an exhaust gas from the scroll channel to a turbine wheel, the nozzle plate including an annular plate portion that has a channel wall surface defining the exhaust gas channel on one side in a thickness direction and a tubular portion that extends from an inner peripheral end portion on a back surface of the annular plate portion located on another side in the thickness direction toward a first inner wall surface of the turbine housing; and
a sealing device for sealing a section between the first inner wall surface and an end surface of the tubular portion, wherein the sealing device includes:
a first plate member that has one surface contacting the end surface of the tubular portion; and
a sealing member for sealing a section between the first inner wall surface and another surface of the first plate member, the sealing member being configured to bias the first plate member toward the end surface of the tubular portion,
wherein the sealing device further includes a second plate member that has one surface contacting the first inner wall surface, and
wherein the sealing member is disposed at a position in an axial direction corresponding to the end surface of the tubular portion such that the sealing member is entirely within a radially outermost extent of the end surface of the tubular portion and a radially innermost extent of the end surface of the tubular portion and is configured to contact another surface of the second plate member.

2. The sealing structure of the turbocharger according to claim 1,
wherein the first plate member includes a radial plate portion that extends toward a second inner wall surface of the turbine housing extending in a direction intersecting with the first inner wall surface, and
wherein the radial plate portion has an outer end surface configured to contact the second inner wall surface.

3. The sealing structure of the turbocharger according to claim 1,
wherein the sealing member has a cross-sectional shape which is formed into a U-shape, a V-shape, or a J-shape having an opening on a radially outer side.

4. A turbocharger, comprising:
a turbine wheel; and
the sealing structure of the turbocharger according to claim 1.

5. A sealing structure of a turbocharger, comprising:
a turbine housing including a scroll channel;
a nozzle mount supported in the turbine housing;
a nozzle plate defining, with the nozzle mount, an exhaust gas channel for introducing an exhaust gas from the scroll channel to a turbine wheel, the nozzle plate including an annular plate portion that has a channel wall surface defining the exhaust gas channel on one side in a thickness direction and a tubular portion that extends from an inner peripheral end portion on a back surface of the annular plate portion located on another side in the thickness direction toward a first inner wall surface of the turbine housing; and
a sealing device for sealing a section between the first inner wall surface and an end surface of the tubular portion
wherein the sealing device includes:
a first plate member that has one surface contacting the end surface of the tubular portion; and
a sealing member for sealing a section between the first inner wall surface and an other surface of the first plate member, the sealing member being configured to bias the first plate member toward the end surface of the tubular portion,
wherein the first plate member includes:
a radial plate portion that extends toward a second inner wall surface of the turbine housing extending in a direction intersecting with the first inner wall surface; and
an axial plate portion that extends from an inner end portion of the radial plate portion toward the first inner wall surface, and covers at least a portion of the sealing member in the direction intersection the first inner wall surface.

* * * * *